US005753350A

United States Patent [19]

Bright

[11] Patent Number: 5,753,350

[45] Date of Patent: May 19, 1998

[54] ARTICLE LABELED BY A LABELING MACHINE APPLYING A TACTILELY DISTINGUISHABLE MARKING

[75] Inventor: Lyn E. Bright, Ceres, Calif.

[73] Assignee: B&H Manufacturing Company, Compton, Calif.

[21] Appl. No.: 738,030

[22] Filed: Oct. 24, 1996

Related U.S. Application Data

[62] Division of Ser. No. 501,995, Jul. 13, 1995, Pat. No. 5,702,559.

[51] Int. Cl.[6] .......... B32B 3/00

[52] U.S. Cl. .......... 428/195; 206/459.1; 206/471; 206/534; 226/115; 434/113; 434/114

[58] Field of Search .......... 156/353, 354, 156/355, 351, 356, 357, 361, 568, 456, 521, 520, 518; 206/459.1, 534, 540, 542, 496, 671; 220/90.2; 226/115; 434/113, 114, 115; 400/120.18

[56] References Cited

U.S. PATENT DOCUMENTS

| | | | |
|---|---|---|---|
| 2,565,608 | 8/1951 | Hoff . | |
| 3,254,750 | 6/1966 | Kellerton et al. | 197/6.1 |
| 3,607,340 | 9/1971 | Stroupe | 117/10 |
| 3,640,368 | 2/1972 | Weinberger | 197/6.1 |
| 3,823,804 | 7/1974 | Lokey | 197/6.1 |
| 4,107,710 | 8/1978 | Hoffmann | 156/450 |
| 4,108,710 | 8/1978 | Hoffmann . | |
| 4,183,683 | 1/1980 | Hirarsuka et al. | 400/122 |
| 4,242,167 | 12/1980 | Hoffmann . | |
| 4,261,663 | 4/1981 | Grimnes | 400/122 |
| 4,653,942 | 3/1987 | Soloveychik et al. | 400/122 |
| 4,692,041 | 9/1987 | Dyma et al. | 400/82 |
| 4,702,630 | 10/1987 | Igi et al. | 400/82 |
| 4,735,516 | 4/1988 | Galarneau | 400/122 |
| 4,762,229 | 8/1988 | Wickre . | |
| 4,923,557 | 5/1990 | Dickey | 156/18 |
| 4,930,914 | 6/1990 | Hulterstrum et al. | 400/122 |
| 5,011,032 | 4/1991 | Rollman . | |
| 5,193,921 | 3/1993 | Tsukuda et al. | 400/120 |
| 5,209,584 | 5/1993 | Galartneau . | |
| 5,251,758 | 10/1993 | Kolacek . | |

OTHER PUBLICATIONS

Nordson Controlled Fiberization Technology (1992 Nordson Corporation) (NWL-92-326).

*Primary Examiner*—Merrick Dixon
*Attorney, Agent, or Firm*—Brooks & Kushman P.C.

[57] ABSTRACT

Method and apparatus for applying tactilely sensible indicia on articles is disclosed. Articles may be marked with glue droplets from a glue spit gun. Alternatively, labels may be embossed or marked with glue droplets and then applied to articles. The labels may come from a continuous roll of stock and then cut into discrete labels while the labels are concurrently be marked with the tactilely sensible indicia.

7 Claims, 3 Drawing Sheets

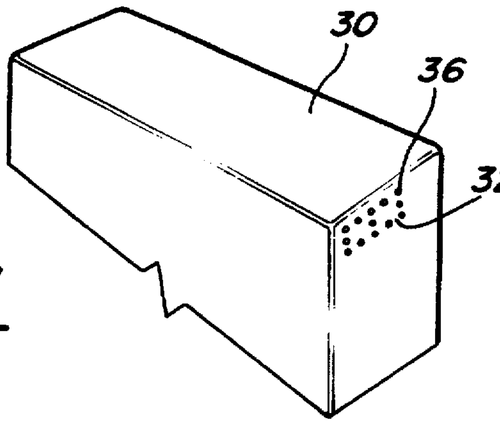
Fig-1
Fig-2
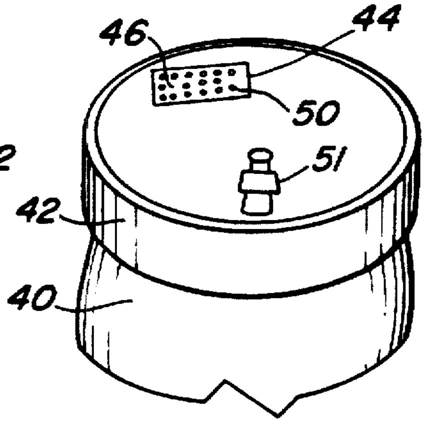
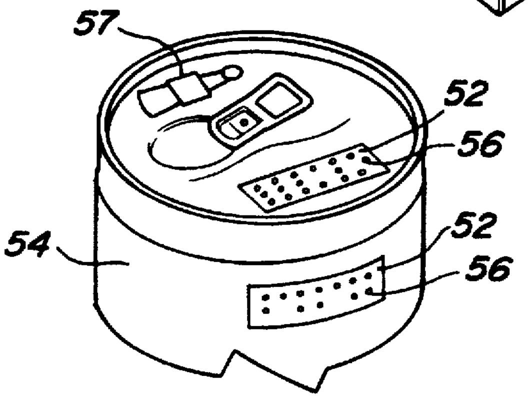
Fig-3
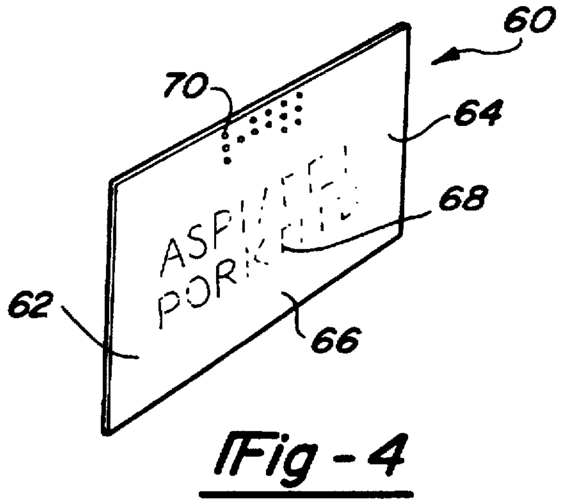
Fig-4
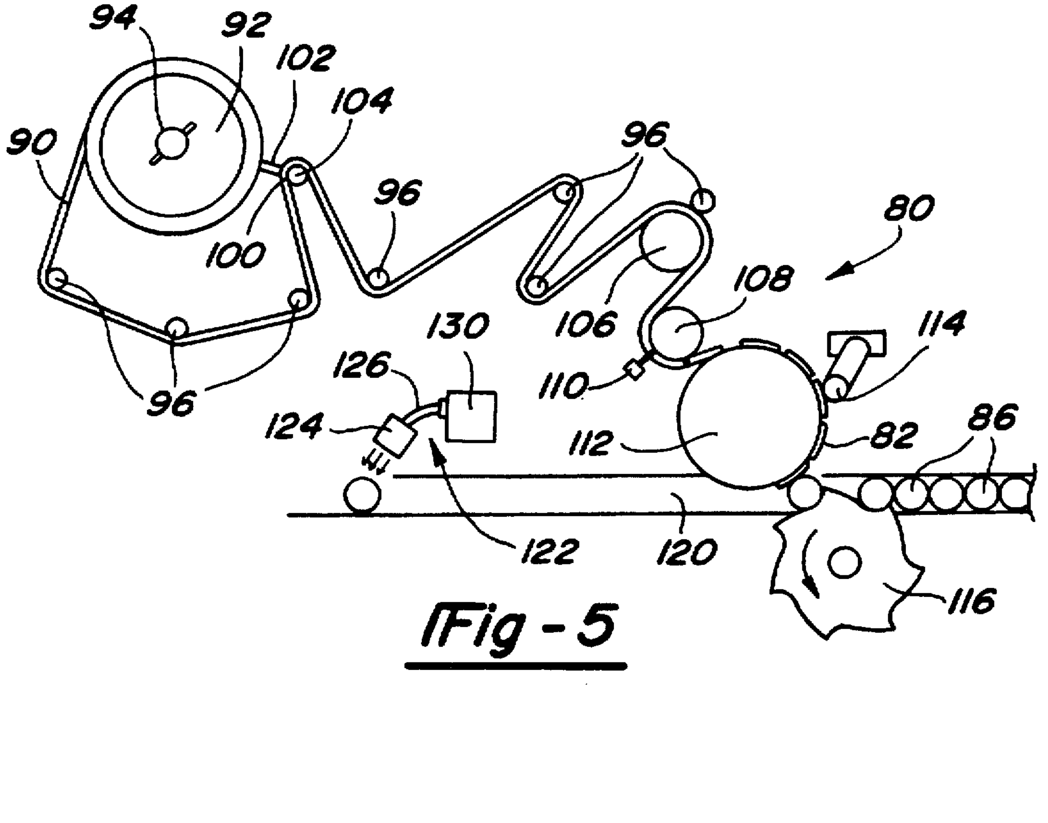
Fig-5

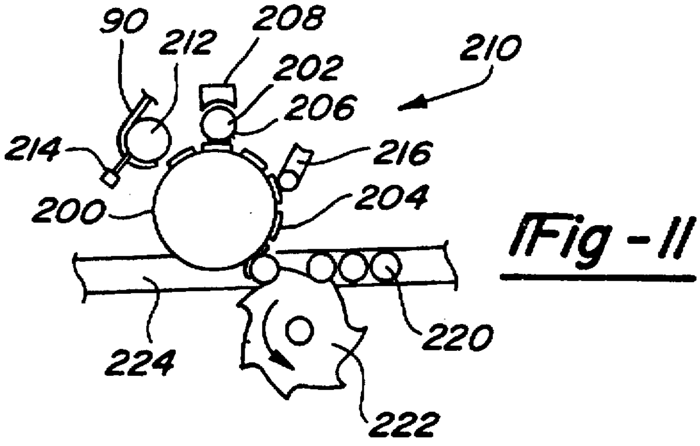
Fig-11
Fig-12
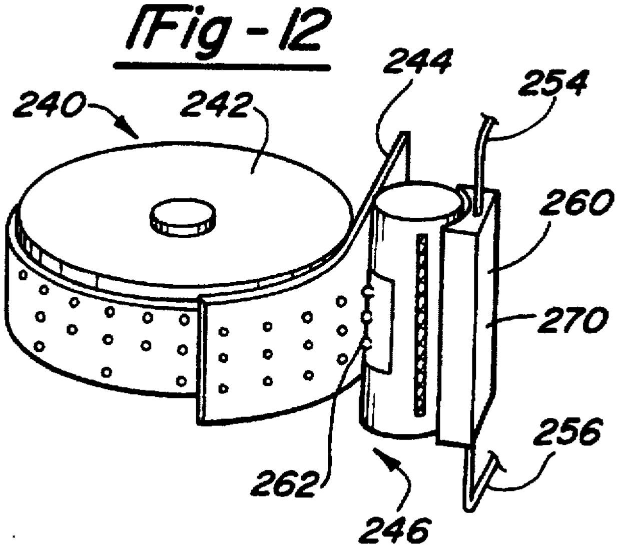
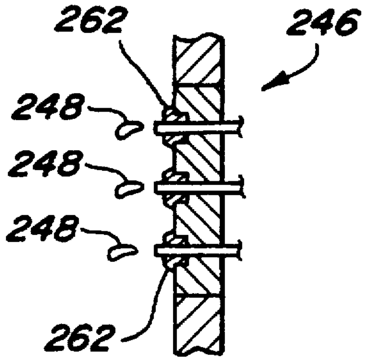
Fig-13
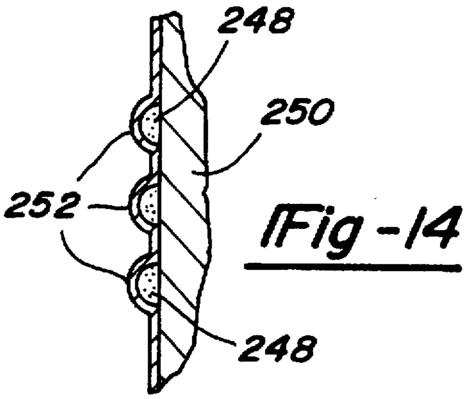
Fig-14
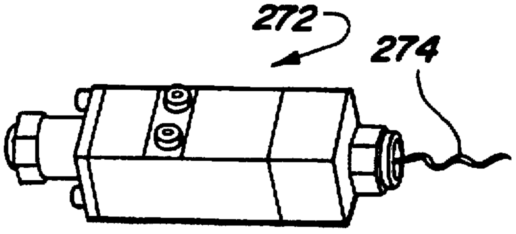
Fig-15

ARTICLE LABELED BY A LABELING MACHINE APPLYING A TACTILELY DISTINGUISHABLE MARKING

This is a divisional of application Ser. No. 08/501,995 filed on Jul. 13, 1995, U.S. Pat. No. 5,702,559.

INCORPORATION BY REFERENCE

This application hereby incorporates by reference U.S. Pat. No. 4,242,167, entitled "Labeling Machine".

TECHNICAL FIELD

The present invention relates to methods and apparatus for forming braille markings on labels or articles and applying those labels to containers.

BACKGROUND ART

Providing braille characters, icons, or other tactilely distinguishable markings or indicia on containers allows visually impaired persons to ascertain the contents of packages or containers. Prior art containers have been developed which have braille or indicia molded therein as part of the container manufacturing process. Braille indicia has also been directly stamped or embossed into the container.

Prior art methods for providing braille characters or icons however have several shortcomings. Applying braille markings at the time of printing presents problems due to the difficulties that would then be encountered at the point of application. Cut and stacked labels have a tendency to nest and thus stick together. As a result, each label would have to be separated one at a time during application of the labels to a container or article. In another type of labelling process, using roll-fed labels, a continuous roll is unwound. In such a process, the presence of the indicia would cause the roll itself to be lop-sided. The resultant lop-sided roll would then encounter difficulties during precision winding and unwinding.

Accordingly, there is a need to provide a method and apparatus for applying tactilely distinguishable markings to containers which lends itself to mass manufacturing and overcomes the deficiencies of prior methods and apparatus for applying such markings to containers or articles.

SUMMARY OF THE INVENTION

It is an object of the present invention to provide a method and apparatus for applying braille markings to labels at production speeds.

It is another object to provide a method and apparatus wherein a continuous roll of label material is marked with tactilely distinguishable markings with labels being cut from the roll and applied to containers.

It is yet another object to use an adhesive applying apparatus to apply glue droplets in a controlled and predetermined pattern on the surface or reverse side of a label to produce tactilely distinguishable markings.

In meeting the above objects, advantages and features, a method is provided for labeling articles for identification by visually impaired persons. The method comprises providing a sheet of material, preferably, having printed matter on one side for use as a label. A tactilely distinguishable marking is then provided on a portion of the sheet for product identification by visually impaired persons. The sheet of material is applied to the article or becomes part of the article. The step of providing the tactilely distinguishable marking may include applying a glue pattern to the sheet. The glue pattern may be applied either on the side of the label containing the printed matter, or else, on the opposite side adjacent the article producing bumps or ridges on the label, which is preferably formed of a lightweight film or paper. Alternatively, the sheet of material may be stamped or embossed to produce ridges. Further, it is possible to directly apply the glue pattern to the product without utilizing a label.

The sheet of material may come from a roll of material which is unwound. Individual sheets are then cut from the roll. The tactilely distinguishable marking may be provided in registry with the cutting of the sheet from the roll. An adhesive applying apparatus such as a glue spit gun may be used to apply droplets of glue forming the marking or indicia.

BRIEF DESCRIPTION OF THE DRAWINGS

These and other features, objects, and advantages of the present invention will become readily apparent from the following description, pending claims, and accompanying sheets of drawings where:

FIG. 1 is a perspective view of an article with braille markings thereon, marked in accordance with the present invention;

FIG. 2 is a perspective view of a label with braille markings thereon which is secured to a cap or cover of a container and an icon which can also be applied to a cap or cover of a container;

FIG. 3 is a perspective view of a label with braille markings which may be applied to the top of a beverage container, or alternatively, to the side of the beverage container and an icon which can also be applied to the top of a beverage container;

FIG. 4 is a perspective view of a label with braille markings thereon;

FIG. 5 is a schematic top view of one alternative of a labeling apparatus which applies braille markings onto labels during attachment of the labels to containers;

FIG. 11 is a top schematic view of another embodiment of a labeling apparatus used to place braille markings on labels which are subsequently applied to containers;

FIG. 12 is a perspective schematic view of another labeling apparatus embodiment in which a label, secured to a vacuum drum and passing adjacent a glue spit gun, receives droplets of glue;

FIG. 13 is a fragmentary sectional view taken through the glue spit gun of FIG. 12;

FIG. 14 is a sectional view of a label having glue droplets located on the underside thereof which has been applied to a container producing tactilely identifiable ridges on the label; and FIG. 15 is a perspective view of a glue application apparatus designed to emit glue in a spiral pattern.

BEST MODES FOR CARRYING OUT THE INVENTION

Figure 6:
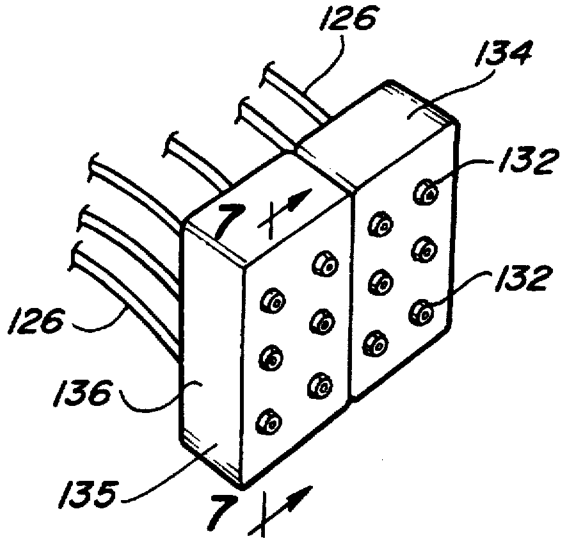
FIG. 6 is a perspective view of a glue spit gun used to apply droplets of glue to a label or container.
Figure 7:
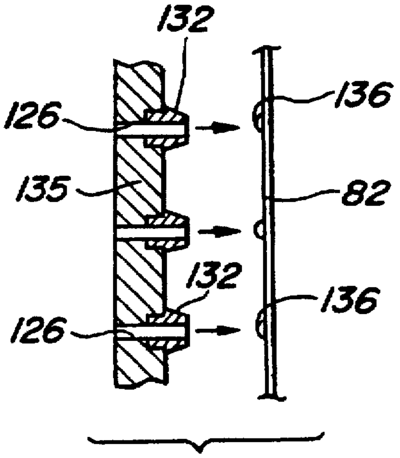
FIG. 7 is a sectional view of the glue spit gun taken generally along line 7—7 of FIG. 6.

FIGS. 1–3 show articles having tactilely distinguishable indicia or markings thereon to assist visually impaired persons to ascertain information about the respective articles. FIG. 1 shows a cardboard box 30, such as a cereal box, with a tactilely distinguishable marking 32 adhesively secured to box 30. Marking 32 has individual bumps or ridges 36. Ridges 36 are preferably arranged in a conventional braille lettering format. Alternatively, an icon or trademark could be formed on the label as a raised or embossed area which would be perceptible by the visually impaired.

The tactilely distinguishable marking can be made by applying a viscous liquid material in a distinct pattern onto the label and allowing the viscous liquid material to solidify. The viscous liquid material can be applied on either side of the label, the side of the label containing the printed matter or the opposite side adjacent the article producing bumps or ridges on the label. The viscous liquid material includes adhesives which can be delivered in a precise pattern and which maintain the pattern while adhering to the underlying article, label or container. Possible adhesives include hot-melt adhesives, which quickly melt upon heating and then set to a firm bond on cooling. Hot-melt adhesives often include polyethylene, polyvinyl acetate, polyamides or hydrocarbon resins.

In a preferred method of application, the viscous liquid material is an adhesive or glue. A glue spit gun, as will be described later, may be used to spit individual glue droplets into the braille lettering format 32. The glue or adhesive may also be applied using spraying methods. Alternatively, during manufacture of box 30, marking 32 could be embossed, debossed or stamped into box 30. Also, it is possible that marking 32 could be applied to box 30 by way of a label.

FIG. 2 shows a bottle 40 and cap 42 with a label 44 adhesively secured thereto. Label 44 has a marking 46 thereon, again including an arrangement of ridges 50. FIG. 2 also depicts an embossed tactilely discernible icon 51 formed on the top or crown of the bottle cap 42. Alternatively, as seen in FIG. 3, a label 52 can be applied to the top or side of a beverage can 54. Label 52 contains tactilely ascertainable information, such as in the form of ridges 56 arranged in a braille configuration. Additionally, FIG. 3 depicts an embossed tactilely discernible icon 57 formed on the top or crown of the beverage can 54.

FIG. 4 illustrates a discrete label 60 which is illustrated as rectangular in shape, although other shapes may also be utilized. Label 60 has a leading end portion 62, a trailing end portion 64 and an intermediate portion 66 extending therebetween. Ideally, label 60 has printed matter 68 such as words, photographic reproductions or sketches thereon. Ridges 70 are located on intermediate portion 66. Label 60 is ideally made of a flexible plastic such as polypropylene film or polystyrene film but also may be made of paper or paper laminates. It is preferred that the label material be thin enough to readily produce discernable ridges.

FIG. 5 schematically shows a first embodiment of a labeling apparatus 80 used to apply labels 82 on to cans 86. Continuous label stock or material 90 is stored on a spool 92 which is pivotally supported by an axle 94. Stock 90 passes over a plurality of idler wheels 96. A tensioner mechanism 100, including an arm 102 and a wheel 104, is used to keep stock 90 taut. A drive roller 106, located downstream of spool 92, is rotated against one of the idler wheels 96 to pull stock 90 downstream from wheel 92. A cutter unit 110 periodically cuts continuous stock 90 into labels 82 of predetermined length. A first rotatable vacuum drum 108 applies a vacuum to and holds stock 90 until stock 90 is cut into individual labels 82. Another approach to the cut off step is to first shear the label which is then transferred to the second vacuum drum 112.

Second rotatable vacuum drum 112 holds individual labels 82 using a vacuum. Examples of a vacuum drum releasably holding a label thereto can be found in U.S. Pat. No. 4,242,167, which has been incorporated by reference into this application. The vacuum on the leading edge portion of labels 82 is released when labels move adjacent to vacuum drum 112 thereby providing for the transfer of the label 82 from vacuum drum 108 to vacuum drum 112. As vacuum drum 112 rotates, a glue wheel 114 applies glue on the backside of labels 82, ideally on the leading and trailing edges of labels 82. Vacuum drum 112 holds labels 82 until individual labels 82 are pressed against containers 86. Containers 86 move relative to vacuum drum 112 by a star wheel 116 which receives containers 86 from a conveyor belt 120. The glue on the backside of labels 82 secure labels 82 to containers 86. The labeled containers 86 are then transported by conveyor 120 to a glue spit gun 122.

Glue spit gun 122 includes a discharge head 124, conduits 126 and a glue supply 130. FIG. 6 shows discharge head 124 in greater detail. Eight individual nozzles 132 are arranged on each of a pair of side by side blocks 134 and 135. Nozzles 132 are supplied with glue from conduits 126. Adhesive or glue droplets 136 are appropriately sprayed onto the outside of labels 82 to form a pair of braille digits or numbers as containers 86 pass by glue spit gun 122. The glue droplets 136 quickly dry on labels 82 to produce tactilely discernable indicia. The adhesive or glue is preferably a hot melt, a solid thermoplastic material which quickly melts upon heating and then sets to a firm bond on cooling. An example of a glue spit gun is commercially available from J & M Laboratories of Dawsonville, Ga. Alternatively, a thick deposit of ink or any other quick drying liquid medium could be used in place of glue provided that it dried to a tactilely perceptible marking.

Figure 8:
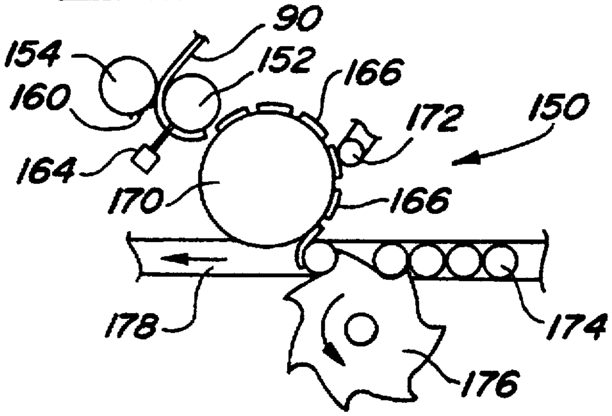
FIG. 8 is a top schematic view of a portion of another embodiment of a labeling apparatus which uses a die to emboss braille markings onto a label which is then applied to a container.
Figure 9:
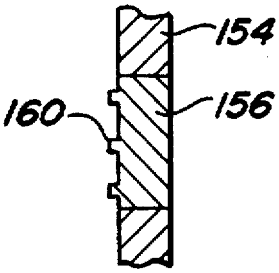
FIG. 9 is a sectional view of the die with projections thereon used in the labeling apparatus of FIG. 8.

FIG. 8 shows a second embodiment of a labeling apparatus 150. Again stock 90 is fed from a spool, not shown. Stock 90 is threaded between a pair of rollers 152 and 154. Roller 154, as shown in FIG. 9, includes a male die insert 156 held thereon which includes a predetermined pattern of projections 160 which are arranged in a predetermined braille lettering pattern. As rollers 152 and 154 rotate, they emboss in stock 90 a braille pattern of ridges corresponding to projections 160. Ideally, roller 152 is a hardened back-up roller. However, it should be appreciated that it may be necessary to utilize a soft back-up roller or a corresponding female die to maintain character integrity.

A cutter assembly 164, located adjacent roller 152, cuts appropriately sized labels 166 from stock 90. Roller 152 is a vacuum drum which applies a vacuum to hold stock 90 thereagainst while label 166 is cut. Each individual label 166 carries the embossed braille pattern thereon. The cutter assembly 164 and die insert 156 are in registry with one another as die rollers 152 and 154 are rotated so that the braille pattern and any printed matter on labels 166 are appropriately located relative to the leading and trailing edge portions on labels 166.

Labels 166, after they are cut, are passed onto a large vacuum drum 170 and are pressed against a glue wheel 172.

Figure 10:
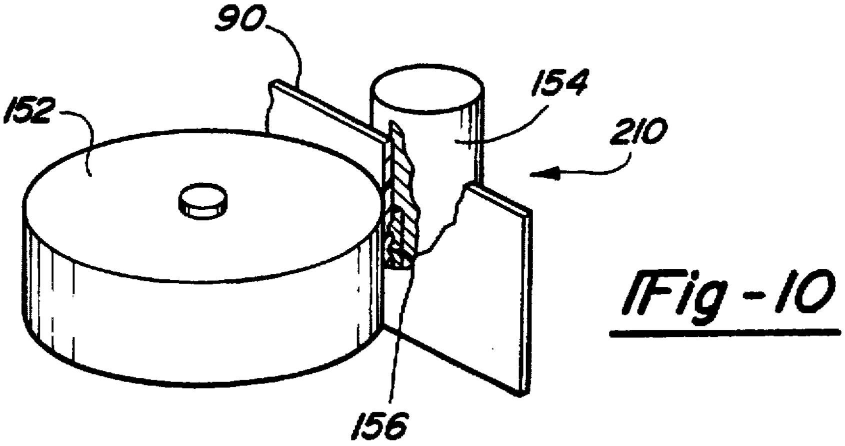
FIG. 10 is a perspective view of a label being roll formed between a vacuum drum and a roller.

Glue wheel 172 applies glue to the leading and trailing edges of labels 166 without damaging the embossed braille pattern in the labels 166. Labels 166 are then transported to mate against containers 174 carried by a star wheel 176. The glue on labels 166 affix to containers 174 and the vacuum applied by vacuum drum 170 to labels 166 adjacent star wheel 176 is removed allowing labels 166 to attach to containers 174. Containers 174 are carried to and from star wheel 176 by a conveyor 178. With labeling apparatus 150, the braille ridges project outwardly from containers 174. Alternatively, it is possible to arrange a roller with dies on the opposite side of the labels so as to produce indentations on the labels after they are affixed to the containers. FIG. 10 shows rollers 152 and 154 in perspective embossing a label 90 passing therebetween.

FIG. 11 illustrates a vacuum drum 200 and mating glue wheel 202 used in a third embodiment of labeling apparatus 210. As a label 204 is transported upon vacuum drum 200, a glue wheel 202 applies a prearranged pattern of glue droplets upon labels 204. Roller 202 has projections 206 located thereon which picks up glue from a reservoir 208 prior to transferring the glue to labels 204.

Stock 90, preferably with printed matter thereon, is fed around roller 212 which utilize a vacuum to hold stock 90. A cutter apparatus 214 cuts individual labels 204 from stock 90. As labels 204 are cut, these labels 204 are held on vacuum drum 200 by vacuum. When labels 204 pass between vacuum drum 200 and roller 202, tactilely discernible braille indicia in the form of glue droplets are formed on to labels 204. A glue wheel 216 applies glue onto the backside of labels 204. Labels 204 are then carried to and are pressed upon cans 220 with the vacuum from vacuum drum 200 being removed from labels 204 at this point with the glue holding the respective labels 204 to containers 220. Again a star wheel 222 and a conveyor 224 are used to transport containers 220 to and from vacuum drum 200.

A portion of a third embodiment of a labeling apparatus 240 is schematically depicted in FIG. 12. Again, a vacuum drum 242 is used to hold a label 244. A glue spit gun 246 spits droplets 248 of glue onto the backside of label 244 or the side opposite vacuum drum 242. Vacuum drum 242 and spit gun 246 would replace respective vacuum drum 200 and glue wheel 202 of apparatus 210 of FIG. 11.

When label 244 is pressed upon a container 250, droplets 248 of glue cause ridges 252 to form in label 244 as seen in FIG. 14. By applying the glue droplets 248 in a braille lettering configuration, label 244 becomes tactilely readable by a visually impaired person. Also, rather than using separate glue wheel in low production applications, spit gun 246 could be used to apply glue to the leading and trailing edge portions of labels 244 along with applying droplets 248.

Glue spit gun 246 includes a supply conduit 254 and a drain conduit 256. A reservoir 260 holds molten glue therein under pressure. Nozzles 262 spray droplets 248 onto label 244. A computer controller 270 controls the timing and pattern of the sputtering of the glue droplets from spit gun 246 onto labels 244.

The preferred labeling apparatus is the Nordson Controlled Fiberization System 272 as shown in FIG. 15, wherein the nozzle design causes air and streams of adhesive or glue to be readily controllable. The Nordson Controlled Fiberization process uses multiple streams of air directed to the glue, as it is delivered by the nozzle, whereby the glue is cooled and formed into a spiral pattern 274 by the multiple air streams. The Nordson system thus allows for increased control of glue placement.

Again, the Nordson Controlled Fiberization System 272 would replace the glue wheel 202 and spit gun 246 of FIGS. 11 and 12. The Nordson Controlled Fiberization System emits droplets of glue unto the backside of label 244, held by the vacuum drum 242.

The Nordson Controlled Fiberization System 272 is the preferred labeling apparatus in large part because of its exceptional control of glue placement. Additionally, the reduced temperature of the glue minimizes heat distortion of the labels during the glue application process without compromising production speeds.

While in the foregoing specification this invention has been described in relation to certain preferred embodiments thereof, and many details have been set forth for the purpose of illustration, it will be apparent to those skilled in the art that the invention is susceptible to alteration and that certain other details described herein can vary considerably without departing from the basic principles of the invention. For example, a glue gun can be used to label containers such as those depicted in FIGS. 1-3 as they are passed down a conveyor line. Further, it is envisioned that a concentrated air pattern emitted from a computer controlled air gun, similar to glue guns 122 and 246, could be used to impart deformations to a label producing a tactilely identifiable indicia pattern.

What is claimed is:

1. An article labeled by a labeling machine comprising:

a container;

a sheet form label applied by the labeling machine to said container as the container is fed through the labeling machine, said label having an interior surface matingly engaged with said container after application of said label and an exterior surface exposed after application of said label to said container by the labeling machine;

a tactilely distinguishable marking applied to said label by the labeling machine during feeding of the label through the labeling machine for communicating information about the article to consumers having a visual impairment.

2. The labeled article of claim 1 wherein said tactilely distinguishable marking is a series of braille characters formed by applying glue dots to said interior surface of said label.

3. The labeled article of claim 1 wherein said tactilely distinguishable marking is a series of braille characters formed by applying glue dots to said exterior surface outside of said label.

4. The labeled article of claim 1 wherein said tactilely distinguishable marking is an icon embossed onto said sheet form label.

5. An article labeled by a labeling machine comprising:

an article having an exterior surface; and a tactilely distinguishable marking including a series of braille characters formed by the labeling machine applying a plurality of glue dots to said exterior surface of said article during feeding of the article through the labeling machine.

6. The labeled article of claim 5 wherein said article has a crown surface.

7. The labeled article of claim 6 wherein said article has an embossed icon on said crown surface.

* * * * *

UNITED STATES PATENT AND TRADEMARK OFFICE
CERTIFICATE OF CORRECTION

PATENT NO : 5,753,350

DATED : May 19, 1998

INVENTOR(S) : Lyn E. Bright

It is certified that error appears in the above-identified patent and that said Letters Patent is hereby corrected as shown below:

On the cover sheet of the patent under the heading "Assignee" change "Compton, Calif." to "Ceres, Calif.".

Signed and Sealed this

Twenty-fifth Day of January, 2000

*Attest:*

Q. Todd Dickinson

*Attesting Officer*

*Acting Commissioner of Patents and Trademarks*